United States Patent [19]
Allmendinger et al.

[11] Patent Number: 6,057,692
[45] Date of Patent: May 2, 2000

[54] MEASURING ARRANGEMENT FOR DETERMINING THE LIFT OF A VALVE MEMBER

[75] Inventors: Klaus Allmendinger, Bachhagel; Matthias Scherer, Esslingen, both of Germany

[73] Assignee: Daimler Chrysler AG, Stuttgart, Germany

[21] Appl. No.: 09/195,086

[22] Filed: Nov. 18, 1998

[30] Foreign Application Priority Data

Nov. 21, 1997 [DE] Germany ............................. 197 51 661

[51] Int. Cl.⁷ .................................................. G01R 27/26
[52] U.S. Cl. ............................ 324/660; 324/686; 324/687
[58] Field of Search ..................... 324/660, 686, 324/687, 662

[56] References Cited

U.S. PATENT DOCUMENTS

| | | | |
|---|---|---|---|
| 4,562,430 | 12/1985 | Robinson | 340/870.37 |
| 4,638,670 | 1/1987 | Moser | 73/658 |
| 4,837,500 | 6/1989 | Abbringh | 324/61 R |
| 5,172,039 | 12/1992 | Owens | 318/489 |
| 5,317,351 | 5/1994 | Takahara et al. | 354/195.1 |

FOREIGN PATENT DOCUMENTS

| | | |
|---|---|---|
| 0 336 022 | 10/1989 | European Pat. Off. . |
| 2 267 620 | 11/1974 | France . |
| 33 34 636 | 11/1984 | Germany . |
| 33 31 170 | 12/1984 | Germany . |
| 34 43 005 | 8/1985 | Germany . |
| 40 26 917 | 7/1991 | Germany . |
| 43 42 430 | 1/1995 | Germany . |
| 43 26 379 | 2/1995 | Germany . |
| 44 38 059 | 5/1995 | Germany . |
| 2 155 638 | 9/1985 | United Kingdom . |

*Primary Examiner*—Josie Ballato
*Assistant Examiner*—Vincent Q. Nguyen
*Attorney, Agent, or Firm*—Klaus J. Bach

[57] ABSTRACT

In a measuring arrangement for determining the lift of a valve including a cylindrical valve stem member arranged in overlapping telescopic relationship with a stationary cylindrical member so as to be movable relative thereto, one of the cylindrical members has on its surface adjacent the other cylindrical member first and third capacitor structures which are axially spaced, and insulated from, each other and the other is provided on its surface adjacent the one cylindrical member with a second capacitor structure extending axially over the first and third capacitor structures when the valve is in a closed position, all the capacitor structures being electrically connected to a control unit for determining from the capacitance difference between the first and third capacitor structures the position of the valve member.

6 Claims, 1 Drawing Sheet

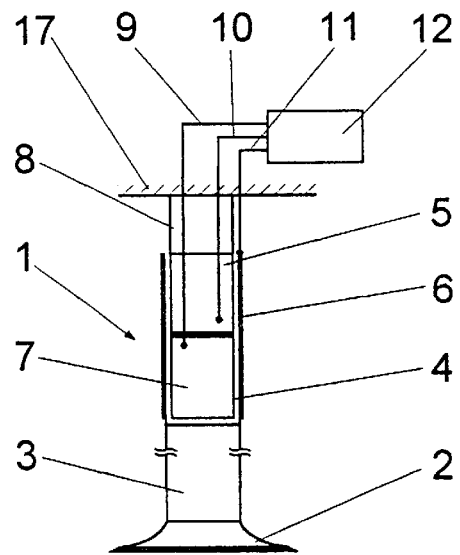
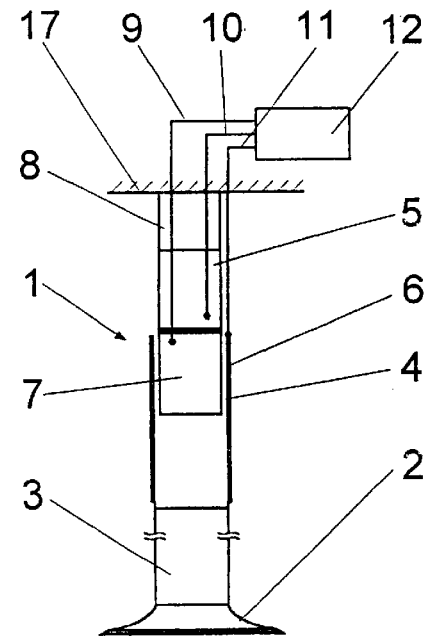
Fig. 1
Fig. 2
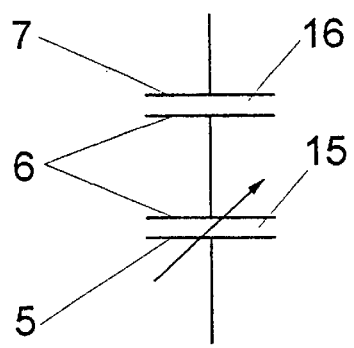
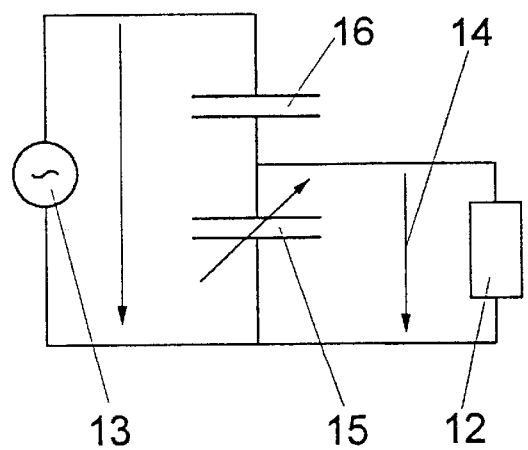
Fig. 3
Fig. 4

MEASURING ARRANGEMENT FOR DETERMINING THE LIFT OF A VALVE MEMBER

BACKGROUND OF THE INVENTION

The invention concerns a measuring arrangement for determining the lift of a valve member including a stationary capacitive sensor structure, a movable capacitive sensor structure which is connected to the valve member and arranged coaxially with the stationary capacitive sensor structure and, during movement of the valve, moves in overlapping relationship with the stationary capacitive sensor structure.

With a variable control of gas exchange valves, the efficiency and the generation of noxious emissions of internal combustion engines can be substantially improved. For controlling the operation of the valves, electromagnetic actuators or other electrically controllable operating mechanisms which permit a variable valve control over a large range are used. In order to adapt the valve opening movement to the requirements of the cylinder charge change and in order to minimize wear and energy consumption, an additional control of the movement of the valve member is necessary. As the basic value for controlling such a movement the system uses a position signal which represents the position of the valve member at any point in time.

In addition to the gas change, the fuel supply control is important for the efficiency and the emission behavior of internal combustion engines. In this connection, not only the fuel amount, but also the injection timing is important. Consequently, it is also important, to appropriately control the movement characteristics of a valve member of the fuel injection apparatus, for example, the movement of a respective injection nozzle needle. Also, a suitable position signal is utilized for this purpose.

DE 44 38 059 A1 discloses an arrangement for measuring the lift movement of valves such as a gas change valve or a fuel injection valve for an internal combustion engine. The valves are provided with magnetic circuits of which each includes a magnetic field generating coil which is stationary with respect to the valve and a magnetic core, which is moveable together with the valve and whose movement offsets the magnetic circuit. If the magnetic coils are energized by an AC current, the movement of the magnetic core causes in the magnetic circuit an impedance change which is used as a criterion for the lift movement of the respective valve. If the magnetic coils an energized by DC current, the voltage induced in the coils is used as the criterion for the speed of movement of the respective valve. In order to maintain expenditures low and to compensate for temperature influences the magnetic field generating coils of two valves which are operated at different points in time are connected in oppositely acting branches of a bridge circuit. However, because of the hysteresis effects, inductive measuring procedures are usable only in a limited way.

DE 43 26 379 A1 discloses a measuring arrangement for measuring the lift of spring-loaded valves of internal combustion engines with a capacitive lift travel sensor which includes a stationary sensor part associated with the housing and another sensor part movable with the valve. The two sensor parts are arranged within the space surrounded by the valve coil spring concentrically around the valve shaft. The sensor part, which is stationary with the housing and the sensor part which is movable with the valve form a valve lift-dependent measuring capacitor, wherein the overlap of the sensor parts provides, by a change of the capacitance, a measurement signal which depends on the valve lift. There is no compensation for temperature influences.

DE 33 31 170 C1 discloses an apparatus for determining the travel distance of a piston of hydraulic pneumatic or hydropneumatic apparatus such as vibration dampers, gas springs and hydropneumatic springs operating in accordance with the tubular capacitor principle. Herein, a first axially movable electrode is formed by a hollow piston rod and a second stationary insulated electrode is supported so as to extend into the hollow piston rod and the capacitance between the two electrodes is measured. In the cylindrical interior of the electrode fixed in the cylinder bottom another stationary tube is provided which is spaced radially from the fixed electrode tube and forms an additional electrode forming, with the first stationary electrode, a capacitor with constant capacity. In this way, a capacitive semi-bridge is formed which comprises the variable capacitance (by movement of the piston rod) and the constant capacitance structure mounted on the cylinder bottom. This arrangement provides for an improved evaluation of the variable capacitance and, at the same time, for a pressure and temperature compensation by taking the ratio of the capacitances into consideration in a suitable electronic control unit. However, with the small radial dimensioning of lift valves of internal combustion engines such an arrangement is not really feasible in connection with internal combustion engines.

EP 0 336 022 A1 discloses a capacitive measuring apparatus in which an electrode connected to a sensor cooperates with several other electrodes which are arranged co-axially and at the same distance from a center electrode. Of the capacitances formed in this way at least one has, during normal use, a constant capacity, whereas other capacitors change their capacity with a displacement of the sensor and generate a signal corresponding to the displacement of the sensor. In the preferred embodiment, a short center electrode is arranged between two end electrodes of the same size. The end electrodes form, with a coaxially arranged additional electrode, capacitors with variable capacitances.

It is the object of the present invention to provide an arrangement for generating a suitable position signal for valve members of an internal combustion engine which arrangement is simple and requires only a small space.

SUMMARY OF THE INVENTION

In a measuring arrangement for determining the lift of a valve member including a cylindrical valve stem member arranged in overlapping telescopic relationship with a stationary cylindrical member so as to be movable relative thereto, one of the cylindrical members has on its surface adjacent the other cylindrical member first and third capacitor structures which are axially spaced and insulated from each other and the other is provided on its surface adjacent the one cylindrical member with a second capacitor structure extending axially over the first and third capacitor structures when the valve is in a closed position, all the capacitor structures being electrically connected to a control unit for determining from the capacitance difference between the first and third capacitor structures the position of the valve member.

The capacitor structure which is always covered by a radially spaced capacitor structure forms together therewith a capacitor with a constant capacitance whereas the other capacitor structure forms a second capacitor whose capacitance is dependent on its axial position and changes with axial movement thereof.

By providing two capacitor structures on a stationary or a movable component in axial alignment with one another and cooperating with a radially displaced co-axial capacitor structure on the respective other component, a slim measuring arrangement is provided with requires only little radial space and which is therefore particularly well suited for use in connection with valve members of internal combustion engines.

The axial length of the capacitor structure which forms the variable capacitor should equal at least the maximum valve lift whereas the capacitor structure which forms the constant capacitor may have any length but preferable has about the same length. The capacitor structure which is disposed on the other (movable) component has an axial length corresponding to the sum of the axial lengths of the two other capacitor structures plus the distance between the two.

If the capacitances of the two capacitors are selected to be the same when they are in full overlap and if the two capacitors which are connected in series are arranged in the form of voltage dividers, half of the voltage drop of the applied voltage occurs at each of the capacitors when the valve member is in its closed end position where the capacitor structures are in full overlap. When the position of the valve member changes, the voltage drop changes non-linearly with the position change of the valve member and consequently provides a measure for the position of the valve member. The voltage signal is available without hysteresis. The advantage of the procedure further lies in the fact that the capacitance change which is in the pF area is not determined by complicated measuring processes, but can be determined by way of a capacitative voltage divider with a constant reference capacitance. Since this reference capacitance is identical in its set up to the measuring capacitance when the valve member is in its end position in which the capacitor structures are in full overlap it is ensured that, in that position, both capacitances are the same whereby a calibration of the reference capacitance is not necessary. In addition, disturbances have the same effect on both capacitors so that disturbances, particularly caused by temperature changes, are compensated for and the measuring results are not affected by disturbances.

Further advantages will become apparent from the following description of the invention on the basis of the accompanying drawings. The drawings show a particular embodiment of the invention. The description and the claims cover various features which may be combined in various ways.

BRIEF DESCRIPTION OF THE DRAWINGS

FIG. 1 shows schematically a gas change valve with a measuring arrangement corresponding to a closed position of the gas change valve 1.

FIG. 2 shows a gas change valve corresponding to that of FIG. 1 but in an open position.

FIG. 3 shows a circuit portion wherein the capacitor structures form capacitors arranged in series, and FIG. 4 shows a circuit wherein the capacitors are arranged and connected so as to form a capacitive voltage divider.

DESCRIPTION OF A PREFERRED EMBODIMENT

A gas change (intake or exhaust) valve comprises a valve member with a valve plate 2 and a valve shaft 3. The valve member is held in a closed position by a valve spring which is not shown and is moved to its open position as shown in FIG. 2 by an electric operating mechanism which is also not shown.

To permit the control of the lift movement of the valve member 2, 3 depending on engine operating conditions or vehicle performance values, the valve member 2, 3 includes a measuring arrangement 1 consisting of a cylindrical chamber 4 in the valve shaft 3 and a cylinder 8 mounted on a housing 17 and extending into the cylindrical chamber 4.

The cylinder 8 which preferably consists of an electrically non-conductive material is provided at its circumference with an electrically conductive first capacitor structure 5 which is insulated with respect to the housing 17 and also insulated with respect to a third electrically conductive capacitor structure 7 which is also disposed on the cylinder 8 in axially spaced relationship from the electrically conductive capacitor structure 5. The capacitor structures 5 and 7 are formed by electrically conductive layers which are deposited on the cylinder 8 in axially spaced relationship and are connected to a control unit 12 by way of control lines 9 and 10.

The inner surface of the cylindrical chamber 4 forms a second capacitor structure 6 which is connected to the control unit 12 by way of a control line 11. The control unit 12 includes a voltage source 13 by which an AC voltage is applied to the capacitor structures 5 and 7.

In the closed end position of the valve member 2, 3 as shown in FIG. 1, the first capacitor structure 5 and the third capacitor structure 7 which have the same axial lengths are fully received in the cylindrical chamber 4, that is, they are both fully covered by, or in overlapping relation with, the second capacitor structure 6. The first capacitor structure 5 forms with the adjacent surface area of the second capacitor structure 6, a first capacitor 15 whereas the third capacitor structure 7 forms with the adjacent surface area of the second capacitor structure 6 a second capacitor 16. The capacitors 15 and 16 are connected in series (FIG. 3).

When the gas change valve is opened the first capacitor structure 5 is moved axially cut of overlap with the second capacitor structure depending on the valve lift until the valve member reaches its fully open end position (FIG. 2). In this position, the first capacitor structure 5 is no longer covered by the second capacitor structure 6 whereas the third capacitor structure remains fully covered that is in fully overlapping relationship with the second capacitor structure. A comparison of the capacitance of the first capacitor structure with the capacitance of the third capacitor structure permits an accurate determination of the position of the valve member.

FIG. 4 shows a capacitive voltage divider, wherein the voltage drop at the variable capacitor 15 is measured as a voltage signal 14 and is utilized by the control unit 12 as a signal for controlling operation of the gas change valve.

The measuring arrangement 1 can be utilized not only in connection with gas change valves of internal combustion engines, but also in connection with injection needle valves of fuel injection systems. In this case, the capacitor structure is disposed within a hollow space in the injection needle which corresponds to the cylindrical chamber 4 of the gas change valve described herein.

What is claimed is:

1. A measuring arrangement for determining the lift of a valve member including a hollow cylindrical valve stem member arranged in overlapping telescope relationship with a stationary cylindrical member extending into said hollow cylindrical valve stem member so as to be movable relative thereto, said stationary cylindrical member having axially adjacent first and third capacitor structures formed on its surface so as to be electrically insulated from one another and the hollow cylindrical valve stem member having, on its surface adjacent the stationary cylindrical member a continuous electrically conductive second capacitor structure having an axial length so as to cover both said first and third capacitor structures when said valve is in a fully closed position but only said third capacitor structure when said valve is in its fully open position, said second capacitor structure forming with said first and third capacitor structures first and second capacitors respectively, whose capacitance changes with axial movement of said valve stem relative to said stationary cylindrical member, said first, second, and third capacitor structures being electrically connected to a control unit for determining the capacitance between said first and third and said second capacitor structures which indicates the position of said valve member.

2. A measuring arrangement according to claim 1, wherein said first and third cylindrical capacitor structures have the same diameter and also the same axial length and said second capacitor structure has an axial length so as to extend axially over both said first and third capacitor structures when said valve is in an end position.

3. A measuring arrangement according to claim 2, wherein said stationary cylindrical member consists of an electrically non-conductive material and extends into said cylindrical valve stem, said stationary cylindrical member having said first and third capacitor structures disposed on its outer surface.

4. A measuring arrangement according to claim 3, wherein said first and second capacitors are electrically connected so as to form a voltage divider including said capacitor with variable capacitance and said capacitor with constant capacitance, and the voltage drop in said variable capacitor upon movement out of said cylindrical valve stem is sensed by said control unit as a position signal for said valve member.

5. A measuring arrangement according to claim 1, wherein said valve member is a nozzle needle valve of a fuel injection system.

6. A measuring arrangement according to claim 1, wherein said valve member is a gas change valve of an internal combustion engine.

* * * * *